(12) United States Patent
Farrar et al.

(10) Patent No.: US 6,911,116 B2
(45) Date of Patent: Jun. 28, 2005

(54) CATIONICALLY MODIFIED WHITE PIGMENTS, THEIR PRODUCTION AND USE

(75) Inventors: John Martin Farrar, Rawdon Leeds (GB); Andrew Clive Jackson, Harrogate (GB); Alec Stewart Tindal, Leeds (GB)

(73) Assignee: Clariant Finance (BVI) Limited, Tortola (VG)

( * ) Notice: Subject to any disclaimer, the term of this patent is extended or adjusted under 35 U.S.C. 154(b) by 142 days.

(21) Appl. No.: 10/149,901

(22) PCT Filed: Dec. 19, 2000

(86) PCT No.: PCT/IB00/01904
§ 371 (c)(1),
(2), (4) Date: Jun. 17, 2002

(87) PCT Pub. No.: WO01/46323
PCT Pub. Date: Jun. 28, 2001

(65) Prior Publication Data
US 2003/0010459 A1 Jan. 16, 2003

(30) Foreign Application Priority Data
Dec. 22, 1999 (GB) .............................................. 9930177

(51) Int. Cl.$^7$ .............................................. D21H 17/69
(52) U.S. Cl. ....................... 162/135; 106/448; 106/465; 106/471; 106/499; 162/158; 162/162; 162/164.3; 162/164.6
(58) Field of Search ................................ 162/158, 162, 162/164.3, 164.6, 135; 106/448, 465, 471, 499

(56) References Cited

U.S. PATENT DOCUMENTS

| | | | | |
|---|---|---|---|---|
| 3,663,538 A | | 5/1972 | Lebkucher et al. .......... | 260/240 |
| 3,757,010 A | | 9/1973 | Balzer et al. ................ | 260/240 |
| 3,970,647 A | | 7/1976 | Balzer et al. ................ | 260/240 |
| 4,210,488 A | * | 7/1980 | Reuss et al. ................. | 162/162 |
| 4,677,158 A | | 6/1987 | Tso et al. | |
| 4,764,544 A | | 8/1988 | Carey et al. | |
| 4,888,128 A | | 12/1989 | Koll et al. | |
| 5,061,461 A | * | 10/1991 | Sennett et al. .............. | 423/112 |
| 5,147,507 A | * | 9/1992 | Gill ............................. | 162/158 |
| 5,650,003 A | * | 7/1997 | Curtis et al. ................ | 106/444 |
| 5,911,855 A | * | 6/1999 | Dransmann et al. ........ | 162/135 |
| 5,919,558 A | * | 7/1999 | Chao .......................... | 428/327 |
| 6,129,785 A | * | 10/2000 | Schliesman et al. ........ | 106/482 |
| 6,140,406 A | * | 10/2000 | Schliesman et al. ........ | 524/493 |
| 6,426,382 B1 | | 7/2002 | Farrar et al. ................ | 524/815 |

FOREIGN PATENT DOCUMENTS

| | | |
|---|---|---|
| EP | 0 491 346 | 6/1992 |
| EP | 1 055 774 | 11/2000 |
| GB | 1 239 276 | 7/1971 |
| GB | 1 313 469 | 6/1973 |
| GB | 1 471 193 | 4/1977 |
| WO | 96/00221 | 1/1996 |
| WO | 99/15596 | 4/1999 |
| WO | WO 9915596 * | 4/1999 |

OTHER PUBLICATIONS

English abstract for EP 1035774, Nov. 29, 2000.
English abstract for JP 55–013735, Jan. 30, 1980.
English abstract for JP 62–106965, May 18, 1987.
English abstract for JP 63–282382, Sep. 23, 1993.
Rev. Prog. Coloration, vol. 17, 1987, pp. 46–47.
U.S. Appl. No. 10/149,952, filed Jun. 17, 2002, inventor Farrar, et al.

* cited by examiner

Primary Examiner—Peter Chin
(74) Attorney, Agent, or Firm—Scott E. Hanf; Anthony A. Bisulca

(57) ABSTRACT

Cationically modified white pigments (W) in particulate form, essentially consisting of a particulate inorganic white pigment (M) of a particle size in the range of 0,1 to 40 μm and an applied water soluble, cationic, crosslinked polymer ($P_A$) containing quaternary ammonium groups in salt form, obtainable by reaction of epichlorohydrin or of epichlorohydrin derivatives or precursors with amines, under conditions leading to at least partial crosslinking, optionally in combination with an anionic optical brightener (B) and where the molar ratio of (B) to ($P_A$) is such that the number of cationic charges of the total polymer ($P_A$) is higher than the number of anionic charges of the total anionic optical brightener (B), are surprisingly useful as cationic white pigments in various fields of technique, especially in papermaking.

25 Claims, No Drawings

CATIONICALLY MODIFIED WHITE PIGMENTS, THEIR PRODUCTION AND USE

In the optical brightening of substrates comprising inorganic substances, in particular as conventionally employed as white pigments or fillers, when using anionic optical brighteners the inorganic substances are usually not brightened to a relevant or useful degree. Further, especially in the field of papermaking, it is also conventional to add some cationic substances, e.g. linear polycationic polymers, especially e.g. as assistants with flocculating properties, more particularly as drainage or retention aids or as fixatives. Such cationic substances may have an adverse effect on anionic optical brighteners by precipitation or quenching due to interaction between the anionic and cationic species. Further the use of such cationic polymers together with inorganic pigments or fillers in aqueous medium may have an undesired influence on the regular distribution of the filler or pigment throughout the aqueous suspension.

In U.S. Pat. No. 4,677,158 there are described polyoxyethylene-substituted quaternary ammonium compounds, which, according to one variant, may be reacted with diisocyanates to give polyurethanes; the ammonium compounds are used to modify certain defined smectite clays.

In U.S. Pat. No. 4,764,544 there are described coated filler comprising acid group-containing organic polymers, which may contain amino groups and which may be crosslinked.

In U.S. Pat. No. 5,147,507 there is described the addition of a cationic polymer, which is the reaction product of an acid dimer with polyamines, to a filler for papermaking, such as calcium carbonate.

EP-A-491346 describes the treatment of fillers pigments for papermaking with cationic polymers containing quaternary cyclic ammonium groups.

JP-A-55-013735 describes the treatment of pigments for paper coating with cationic polymeric electrolytes; in the description there is a very long list of various kinds of polymers, among else some quaternary polymers or some crosslinked polymers.

It has now surprisingly been found that by cationically modifying the inorganic pigments or fillers with certain crosslinked quaternary cationic products as defined below, especially when combined with optical brighteners as described below, there may be achieved products of notable properties e.g. in the brightness of the inorganic products, or in the physical form of the treated inorganic substances, such as workability and regular distribution in suspension.

The invention relates to the defined cationically modified white pigments, their production and use.

The invention thus firstly provides a cationically modified white pigment (W) in particulate form, essentially consisting of a particulate inorganic white pigment (M) of a particle size in the range of 0.1 to 40 $\mu$m and an applied-water soluble, cationic, crosslinked polymer ($P_A$) containing quaternary ammonium groups in salt form, obtainable by reaction of epichlorohydrin or of epichlorohydrin derivatives or precursors with amines, under conditions leading to at least partial crosslinking, in combination with an anionic optical brightener (B) and where the molar ratio of (B) to ($P_A$) is such that the number of cationic charges of the total polymer ($P_A$) is higher than the number of anionic charges of the total anionic optical brightener (B).

The invention thus more particularly concerns the stated modification of particulate inorganic white pigments (M) by ($P_A$) optionally in combination with (B) to the cationically modified products (W).

(M) comprise in general known inorganic substances as usually employed as white pigments or fillers (or loading agents), and which more particularly are conventionally employed in non-coloured form especially in papermaking, and as may also be employed in other fields of technique such as paints, lacquers, cosmetics, plastics, construction material etc. Mainly concerned are those for papermaking, since in papermaking industry problems exist with the quenching of optical brightening agents by additives used to improve retention and drainage during the papermaking process.

The term "pigment" as used herein is intended to comprise also the term "filler", insofar as a same substance may be used as filler or pigment.

The inorganic pigment (M) may be any such substance, naturally occurring and optionally physically modified, or synthetically produced, and preferably as employed in particular in paper coatings or as fillers or loading agents in the paper sheet, as added e.g. in the size or also in the paper pulp suspension. (M) may include mineral substances and synthetically produced inorganic substances, such as silica, alumina, titanium dioxide, zinc oxide and sulphide, and inorganic salts, e.g. silicates, aluminates, titanates, sulphates and carbonates, of low valence metal ions, mainly of alkali metal ions, alkaline earth metal ions or earth metal ions, especially of sodium, potassium, magnesium, calcium, barium and/or aluminium. The following may be mentioned as examples: titanium dioxides (rutile, anatase), potassium titanates, zinc oxide, zinc sulphide, lithopone, calcium sulphates (gypsum or anhydrite), various forms of silica (e.g. amorphous silica such as diatomite), alumina trihydrate, sodium silico-aluminate, talc ($MgO.4SiO_2.H_2O$), barium sulphate (baryte, blanc fixe), calcium sulphoaluminate (satin white), chrysotile, china clay in various degrees of whiteness (mainly comprising $Al_2O_3.SiO_2.H_2O$ and optionally further metal oxides such as iron oxide, titanium dioxide, magnesium oxide, calcium oxide, sodium oxide and/or potassium oxide) and calcium carbonate in various forms (mineral natural form or synthetic precipitated and/or crystallised forms). They may be employed in the forms as commercially available, in particular of various degrees of whiteness, e.g. of a whiteness >80, mostly >82 (measured according to ISO methods), but also less white products may be used, e.g. of a whiteness $\leq 82$, or even $\leq 80$, e.g. in the range of 70 to 80.

The particle size of (M) is on average in the range of 0.1 to 40 $\mu$m, as obtainable by conventional methods, e.g. by grinding and/or milling and/or—if required—sieving and screening, or by suitable precipitation and/or (micro)crystallisation methods. Commercially available products mostly contain in general a certain proportion of particles smaller than 0.1 $\mu$m (dust) and/or some granules larger than 40 $\mu$m; preferably these larger size components are $\leq 20\%$ by weight, more preferably $\leq 10\%$ by weight. Preferably the average particle size of such inorganic pigments (M) is within the range of 0.1 to 20 $\mu$m, more preferably 0.2 to 10 $\mu$m, most preferably 0.2 to 5 $\mu$m, preferably at least 75%, preferably $\geq 80\%$ of the particles being within these ranges. Among the mentioned pigments (M) are preferred those comprising silicates, in particular kaolin, and especially those comprising carbonates, in particular calcium carbonates.

The inorganic pigment (M) may comprise a conventional dispersant or wetting agent as commercially available, on its surface, e.g. polyphosphates, in a suitable low concentration as usual e.g. <0.5% by weight, preferably <0.3% by weight. For the purpose of the invention the presence of such a surfactant is not essential and (M) may also be exempt of a dispersant or wetting agent. As mentioned above, (M) may be employed in the forms as commercially available, in particular it may be employed in dry form or in the form of a concentrated aqueous slurry, e g with a solids content in the range of 40 to 70% by weight Preferred pigments and fillers (M) have e.g. a specific surface area in the range of 5 to 24 m$^2$/g, preferably 7 to 18 m$^2$/g.

The polymers ($P_A$) are crosslinked and contain a sufficient proportion of hydrophilic constituents—in particular the essential quaternary ammonium groups and preferably further hydrophilic constituents which are preferably non-ionogenic, in particular polyethylene glycol ether chains and/or low molecular hydroxyalkyl groups such as hydroxyethyl and 2-hydroxypropyl linked to a hetero-atom which preferably is O or N—so as to be water soluble. By water soluble is meant a product that gives a clear true or colloidal solution in water at a concentration of 3 g/l, at a pH of 7 and at a temperature of 20° C. They are preferably predominantly aliphatic, more preferably fully aliphatic, disregarding the anions present as counter-ions to the ammonium groups.

The quaternary ammonium groups in ($P_A$) are covalently linked to at least two carbon atoms of the polymer, in particular so as to form bridging quaternary ammonium groups and optionally also terminal quaternary ammonium groups. The polymers ($P_A$) may contain further heteroatoms, in particular oxygen atoms and/or non-quaternary amino or ammonium groups. The heteroatoms in the polymer are preferably at a distance of 2 to 6 carbon atoms from each other.

The polymers ($P_A$) are preferably epichlorohydrin-derived polyquaternary polymers, in particular reaction products of epichlorohydrin or of epichlorohydrin derivatives or precursors with amines, preferably secondary and/or tertiary amines, under conditions leading to at least partial crosslinking.

By polyquaternary is meant herein poly-(quaternary ammonium) i.e. polymers containing several quaternary ammonium groups.

The epichlorohydrin-derived polymers are preferably polyquaternary, crosslinked polymers obtainable by a two- or three-stage synthesis, in which in the first stage epichlorohydrin is reacted with a hydroxy and/or primary or secondary amino compound to give a chloroterminated adduct, and then reacting the chloroterminated adduct with a secondary amine or an at least bifunctional tertiary amine in order to obtain a crosslinked product with quaternary ammonium groups in the polymer structure; if any terminal chlorine is still present in the reaction product, this may be reacted e.g. with a monofunctional secondary or tertiary amine.

As starting hydroxy and/or primary or secondary amino compounds there may be employed preferably aliphatic compounds, which may be cyclic, branched or preferably linear, e.g. mono- or poly-functional alcohols, ammonia, primary aliphatic amines with preferably one to six carbon atoms and which, if containing 2 to 4 carbon atoms, may optionally contain a hydroxygroup as a substituent, secondary aliphatic amines with 1 to 6 carbon atoms in each aliphatic radical, and which, if the radical contains 2 to 4 carbon atoms, may also be substituted with hydroxy, aliphatic unsubstituted oligoamines with 2 to 4 carbon atoms in each alkylene bridge, or also oligoamines with an alkanol group as a substituent.

Oligo means in general a number in the range of 2 to 10, mostly 3 to 8, preferably 3 to 6.

Suitable hydroxy compounds are primary $C_{1-4}$-alcohols, bi- to hexa-functional aliphatic alcohols with up to six, preferably three to six, carbon atoms in the hydrocarbon radical, in particular of the following formula

$$X-(OH)_{x1} \qquad (Ia),$$

in which X signifies the x1-valent radical of a $C_{3-6}$-alkane or of a corresponding cyclic ether and x1 signifies a number from 3 to the number of carbon atoms in X, or a mixture of oligohydroxyalkanes of formula (Ia), or a mixture one or more oligohydroxyalkanes of formula (Ia), with a $C_{2-3}$-alkanediol.

or polyalkyleneglycols, in particular of the average formula

$$HO-(Alkylene-O)_{x2}-H \qquad (Ib),$$

wherein Alkylene signifies $C_{2-4}$-alkylene and x2 signifies a number from 2 to 40.

Preferred compounds of formula (Ia) are those of formula

$$H-(CHOH)_{x3}-H \qquad (Ia')$$

with x3 being 3 to 6.

Alkylene in formula (Ib) is ethylene, propylene and/or butylene and the polyalkyleneglycols of formula (Ib) may be homo- or copolymers, preferably water soluble products (with a solubility in water of at least 10 g/l at 20° C. and pH 7). As polyalkyleneglycols of formula (Ib) there are preferably employed polyethyleneglycols or copolyalkyleneglycols containing a prevailing molar proportion of ethyleneoxy-units. More preferably there are employed polyethyleneglycols, i.e. compounds of formula (Ib) in which Alkylene signifies only ethylene.

Suitable mono- or oligo-functional amines with a primary and/or a secondary amino group are for instance mono- or di-($C_{1-4}$-alkyl)-amines, mono- or di-($C_{2-4}$-hydroxyalkyl)-amines and oligo-amines with 2 to 4 carbon atoms in the alkylene bridge, such as mono- or di-methyl-amine, mono- or di-ethyl-amine, mono- or di-isopropyl-amine, mono- or di-ethanol-amine, mono- or di-isopropanol-amine, ethylenediamine, propylenediamine, butylenediamine, diethylenetriamine, triethylenetetramine, tetraethylenepentamine, pentaethylenehexamine and N-(2-aminoethyl)-ethanolamine.

By the reaction of the hydroxy and/or primary or secondary amino groups with the epichloro-hydrin the epoxy ring of the epichlorohydrin is opened and a corresponding adduct is formed which contains a 2-hydroxy-3-chloropropyl-1 radical. This reaction is preferably carried out in the absence of any other solvent and, especially for hydroxy, in the presence of a catalyst, which is e.g. a Lewis acid, preferably boron trifluoride e.g. in the form of its etherate or acetic acid complex. This reaction is exothermic and the epichlorohydrin reacts with the available hydroxy or amino groups and, as reaction proceeds, may also react with a hydroxy group of a 2-hydroxy-3-chloropropyl-1 radical formed during the reaction, so that some of the hydroxy or amino groups in a polyfunctional starting reactant [e.g. of formula (Ia)] may even remain non-reacted. Depending on the molar ratio, on the functionality of the starting hydroxy- or aminocompound and on its configuration—especially if x1 in formula (Ia) or x3 in formula (Ia') is 4 to 6—the degree of reaction of the x1 or x3 OH groups with epichlorohydrin may vary, and may e.g. be in the range of 50 to 95%, mostly 70 to 90%, of the total number of OH groups originally present in the starting polyol. The obtained adduct is a chloro-terminated product.

The chloroterminated adduct is then reacted with a suitable amine to produce a polyquaternary preferably crosslinked product, e.g. with a crosslinking reactant that is capable of providing a bridging quaternary ammonium group, which suitably is a tertiary oligoamine or a secondary monoamine. Such amines may for instance be reaction adducts of epichlorohydrin with one of the above mentioned primary or secondary amino compounds, or preferably correspond to the following formula

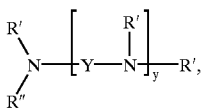 (II)

in which Y signifies $C_{2-3}$-alklylene,
y signifies a number from 0 to 3,
R' signifies $C_{1-3}$-alkyl or $C_{2-3}$-hydroxyalkyl
and R" has a significance of R', if y is 1 to 3, or signifies hydrogen, if y is 0,
especially as a reactant leading to a crosslinking, where the starting oligohydroxycompound is of formula (Ia), preferably of formula (Ia'),
or to the following formula $$N(R')_3 \quad (III).$$

or

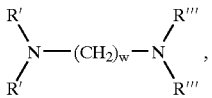 (IV)

wherein R'" signifies hydrogen or $C_{1-3}$-alkyl
and w signifies a number from 2 to 6,
the amines of formulae (III) and (IV) being especially suitable as reactants, where the starting oligohydroxycompound is of formula (Ib).

For an optional chain-terminating reaction there may be carried out an amiation with a suitable secondary or tertiary monoamine, e.g. of formula (II), with y1=0, or of formula (III), preferably a quaternizing reaction with a tertiary monoamine of formula (III).

As amino compounds of formula (II) there may be employed known amines. The $C_{1-3}$-alkyl radicals in R' and R" may be methyl, ethyl, propyl or isopropyl, the lower molecular ones being preferred especially methyl. The $C_{2-3}$-hydroxyalkyl radicals are preferably 2-hydroxy-ethyl or -propyl. Among the $C_{1-3}$-alkyl radicals and the $C_{2-3}$-hydroxyalkyl radicals the $C_{1-3}$-alkyl radicals are preferred, especially methyl. The index y may be any number from 0 to 3 preferably 0 to 2, more preferably 0 or 1. Representative amines of formula (II) are dimethylamine, diethanolamine, tetramethylethylenediamine, tetramethylpropylenediamine, N,N-diethanol-N',N'-dimethylethylenediamine, pentamethyldiethylenetriamine and hexamethyltriethylenetetramine, among which the difunctional amines, in particular the lower molecular ones, are preferred, especially dimethylamine and tetramethylethylenediamine. Representative amines of formula (III) are trimethylamine, triethylamine and triethanolamine, among which trimethylamine and triethylamine are preferred. In formula (IV) the index w preferably signifies 2 or 3. Representative amines of formula (IV) are N,N-dimethylaminopropylamine, N,N-diethanolaminopropylamine, tetramethylethylenediamine, tetramethylpropylenediamine and N,N-diethanol-N',N'-dimethyl-ethylenediamine.

The polycationic polyquaternary products are polymers at least insofar as either the reaction with the amine leads to a polymer or the starting product is polymeric (e.g. is a polyalkylene glycol) or both.

The molar ratio of crosslinking quaternizing amine to epichlorohydrin adduct is suitably chosen so that a product of polymeric character is produced. The molar ratio of quaternizing amine to epichlorohydrin adduct of a compound of formula (Ia) is preferably chosen so that for every mole-equivalent of adduct (with reference to chlorine) there is employed 0.5 mole of crosslinking amine ±30%, e.g. ±10%. The molar ratio of quaternizing amine to epichlorohydrin adduct of a compound of formula (Ib) is preferably chosen so that for every mole-equivalent of adduct (with reference to chlorine) there is employed 1 mole of crosslinking amine of formula (II) (with y=1 to 3, preferably 2 or 3) ±30%, e.g. ±10%. The molar ratio of quaternizing amine to epichlorohydrin adduct of a compound of formula (Ib) is preferably chosen so that for every mole-equivalent of adduct (with reference to chlorine) there is employed 0.9 mole of amine of formula (IV) ±40%, e.g. ±20% (if both R'" are hydrogen) or 0.5 mole of amine of formula (IV) ±30% e.g. 10% (if both R'" are other than hydrogen) or 0.7 mole of amine of formula (IV) ±35%, e.g. ±15% (if one R'" is hydrogen and the other is other than hydrogen).

The concentration of the reactants is preferably chosen in such a way that the concentration of $(P_A)$ in the aqueous mixture is in the range of 10 to 75%, preferably 20 to 70% by weight.

The reaction of quaternizing amine with the adduct is carried out preferably in aqueous medium and preferably with heating, e.g. at a temperature in the range of 50 to 100° C., preferably 60 to 90° C. During the reaction, at least at the beginning, the basicity of the amine is sufficient for the quaternizing alkylation of the amine with the adduct, i.e. with the chloride used as an alkylating agent. The pH of the reaction mixture is preferably in the range of 4 to 9, at the beginning being preferably in the range of 7 to 9. As reaction proceeds, the alkalinity of the mixture and the concentration of crosslinking amine diminish. If in the reaction product there is present a proportion of covalently linked chlorine which is higher than desired, there may e.g. be added a further reactant which is a monofunctional tertiary amine and/or, if the starting crosslinking reactant is a secondary monoamine, there may be added a suitable strong base, such as an alkali metal hydroxide, preferably sodium hydroxide, so that the pH is preferably maintained in the range of 7 to 9. When the reaction has completed or has reached the desired degree, the reaction mixture is suitably acidified by addition of a conventional acid, preferably a mineral acid (such as hydrochloric acid, sulphuric acid or phosphoric acid) or a low molecular aliphatic carboxylic acid e.g. with 1 to 6 carbon atoms (such as formic acid, acetic acid, citric acid or lactic acid), preferably to reach a pH below 7, more preferably in the range of 4 to 7, most preferably in the range of 5 to 6.5. The progress of the reaction may be followed by checking the viscosity of the reaction mixture, which gives an empirical impression of the degree of crosslinking, i.e. quaternization. A suitable viscosity is e.g. in the range of 200 to 3000 cP.

Preferred polymers $(P_A)$ are:
  $(P_{A1})$ crosslinked epichlorohydrin/amine polymers,
  $(P_{A2})$ crosslinked polymers obtained by reaction of epichlorohydrin with oligohydroxy-alkanes and further quaternizing reaction with amines, and
  $(P_{A3})$ crosslinked polymers obtained by rection of epichlorohydrin with a polyalkylene-glycol and further reaction with quaternizing amines.

Among the above are preferred ($P_{A1}$) and especially ($P_{A2}$).

For the production of (W) ($P_A$) is applied to (M) in the presence of water and optionally in combination with (B).

For the production of the cationically modified pigment (W) (M) may thus be mixed with ($P_A$) in aqueous medium; if it is desired or required to produce an optically brightened pigment, an optical brightener (B) may be added either in combination with ($P_A$) or afterwards, e.g. in the same aqueous medium or at a later stage.

According to a further variant a solution of ($P_A$), optionally in combination with (B), may be sprayed on a dry (M)-powder with mixing.

The produced aqueous (W)-suspension may, if desired, be filtered and dried to a white pigment (W) in dry, particulate form of corresponding particle size. If desired it may be agglomerated to larger agglomerate particles, e.g. by compaction e.g. to granules, pellets or tablets.

The invention thus also provides a process for the production of a white pigment (W) in the form of an aqueous suspension, wherein an aqueous supension of (M) is admixed with an aqueous solution of ($P_A$) optionally in combination with (B) and/or followed by application of (B), and also a process for the production of a white pigment (W) in dry form, wherein an aqueous supension of (M) is admixed with an aqueous solution of ($P_A$) optionally in combination with (B) and/or followed by application of (B), the suspension is filtered and the residue is dried and optionally compacted.

This process is in particular carried out substantially in the absence of further functional additives that would interfere in a disturbing way with the reaction, in particular in the absence of other functional papermaking additives and components (such as resins, fibres and/or paper-size components).

The weight ratio of ($P_A$) to (M)—referred to the respective dry forms—may range broadly, depending on the desired degree of cationic modification of (M) in (W); it may e.g. range in the scope of 0.01:100 to 10:100, preferably 0.2:100 to 5:100, more preferably 0.3:100 to 4:100. For compacted dry forms this weight ratio is preferably in the range of 0.01:100 to 3:100, more preferably 0.2:100 to 2:100.

The polymer ($P_A$) may be applied in the form of an aqueous solution—e.g. of a concentration in the range 0.1 g/l to the saturation limit—to (M) by any suitable method. If (M) is used in the form of an aqueous slurry, the ($P_A$)-solution is preferably a concentrated solution—e.g. of a concentration in the range 1 g/l to the saturation limit, preferably in the range of 5 g/l to 40 g/l—and may be mixed with it in the desired proportion e.g. by plain stirring and optionally with heating or cooling, e.g. at a temperature in the range of 5 to 60° C., preferably 10 to 40° C., more preferably with slight heating e.g. in the temperature range of 25 to 40° C. or at ambient conditions without any heating or cooling. If (M) is in the dry form, a sprayable, preferably more diluted solution of ($P_A$)—e.g. of a concentration in the range of 0.1 to 20 g/l, preferably 0.5 to 10 g/l—may e.g. be applied by spraying and mixing, optionally with heating or cooling, e.g. at a temperature in the range of 5 to 60° C., preferably 10 to 40° C., more preferably with slight heating e.g. in the temperature range of 25 to 40° C. or at ambient conditions without any heating or cooling.

The pH of the solution of ($P_A$) may range broadly, e.g. from the weakly acidic to weakly basic range, in particular from pH 5 to pH 8, preferably pH 5.5 to pH 7.5.

If desired, ($P_A$) may be combined with a minor equivalent proportion of (B) prior to application to (M).

As (B) there may be employed any anionic optical brightener that is water soluble in the form of its alkali metal salt, in particular anionic optical brighteners suitable for the optical brightening of paper, advantageously containing 2 to 10 anionic groups, preferably 4 to 10 anionic groups, the anionic groups being preferably sulphonate groups and/or carboxylate groups, e.g. 2 to 8, more preferably 2 to 6, sulphonate groups and optionally 2 to 4 carboxylate groups. Anionic optical brighteners, especially those suitable for the optical brightening of paper, are well known in the art and also described in the specialised literature. Preferred categories of optical brighteners are those of the diaminostilbene, bisstilbyl (also referred to as his styryl biphenyl) or 1,3-diphenyl-pyrazoline series, e.g. of the following formulae:

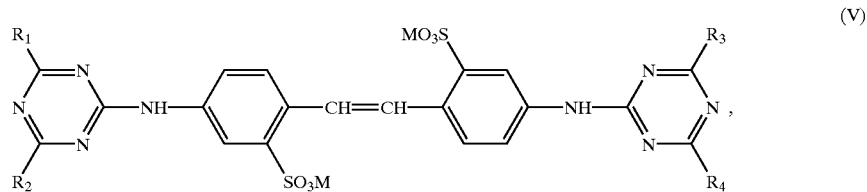

(V)

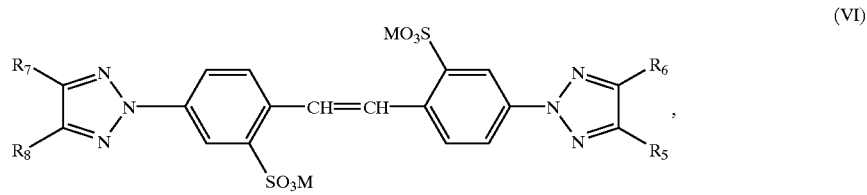

(VI)

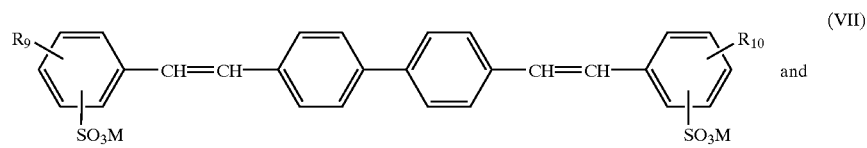

(VII) and

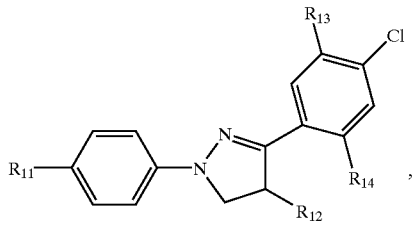

(VIII)

wherein $R_1$, $R_2$, $R_3$ and $R_4$ signify, independently from each other, the radical of an amine or of an alcohol, $R_5$ and $R_7$ signify, independently from each other, $C_{1-2}$-alkyl, phenyl or sulphophenyl, $R_6$ and $R_8$ signify, independently from each other, hydrogen, $C_{1-2}$-alkyl, phenyl or sulphophenyl, $R_9$ and $R_{10}$ signify, independently from each other, hydrogen, $C_{1-2}$-alkyl or -alkoxy, chlorine or $-SO_3M$, $R_{11}$ signifies a radical of formula $-SO_2-(NH)_m-(C_{2-4}$-alkylene)-$SO_3M$, m signifies zero or one, $R_{12}$ signifies hydrogen or $-CH_2-SO_3M$, $R_{13}$ signifies hydrogen or chlorine, $R_{14}$ signifies hydrogen or, if $R_{14}$ signifies chlorine, also methyl and M signifies hydrogen or an alkali metal cation.

In the significances of $R_1$, $R_2$, $R_3$ and $R_4$ the radical of an alcohol is preferably the radical of an aliphatic alcohol or of a phenol. The radical of the aliphatic alcohol is preferably $C_{1-4}$-alkoxy, the phenol radical is preferably unsubstituted phenoxy. The amine radical is preferably optionally substituted anilino or an aliphatic aminogroup $-NR_0'R_0"$, wherein $R_0'$ signifies hydrogen, $C_{1-4}$-alkyl, benzyl, $C_{2-3}$-hydroxyalkyl or carboxy-($C_{1-4}$-alkyl), $R_0"$ signifies hydrogen, $C_{1-4}$-alkyl, $C_{2-3}$-hydroxyalkyl, sulpho-$C_{1-3}$-alkyl, sulpho-$C_{3-4}$-hydroxyalkyl, cyano-($C_{1-3}$-alkyl), carbamoyl-($C_{1-3}$-alkyl), carboxy-($C_{1-4}$-alkyl), carboxy-[cyano-($C_{2-3}$-alkyl)], carboxy-[carbamoyl-($C_{2-3}$-alkyl)] or dicarboxy-($C_{2-3}$-alkyl), or $R_0'$ and $R_0"$ together with the nitrogen to which they are linked form a heterocycle, $R_1$ and $R_3$ preferably signify an optionally substituted anilino group of formula

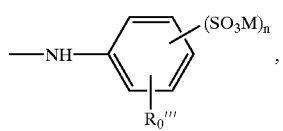

(a)

wherein $R_0'''$ signifies hydrogen, methyl, methoxy or chlorine, preferably hydrogen,
and n signifies 0, 1 or 2,
or an aliphatic aminogroup $-NR_0'R_0"$,
$R_0'$ preferably signifies $C_{1-2}$-alkyl, benzyl, $C_{2-3}$-hydroxyalkyl or carboxy-($C_{1-2}$-alkyl).
$R_0"$ preferably signifies $C_{2-3}$-hydroxyalkyl, carbamoyl-($C_{1-3}$-alkyl), cyano-($C_{1-3}$-alkyl) or carboxy-($C_{1-2}$-alkyl).

If $R_0'$ and $R_0"$ together with the nitrogen to which they are linked form a heterocycle, this is preferably a morpholine ring or a carboxypyrrolidine ring, $R_2$ and $R_4$ preferably signify methoxy, phenoxy or more preferably an aliphatic amino group $-NR_0'R_0"$, The two symbols $R_1$ and $R_3$ in formula (V) may have the same significance or different significances. Preferably they have the same significance.

Similarly also the two symbols $R_2$ and $R_4$ in formula (V) may have the same significance or different significances. Preferably they have the same significance.

$R_5$ and $R_7$ preferably signify phenyl or sulphophenyl.
$R_6$ and $R_8$ preferably signify hydrogen or $C_{1-2}$-alkyl.

The two symbols $R_5$ and $R_7$ in formula (VI) may have the same significance or different significances. Preferably they have the same significance.

Similarly also the two symbols $R_6$ and $R_8$ in formula (VI) may have the same significance or different significances. Preferably they have the same significance.

The two sulpho groups shown in formula (VII) with a floating bond and which do not belong to a significance of $R_9$ and $R_{10}$ are preferably in the respective positions ortho to the ethylene radical.

If the two symbols $R_9$ and $R_{10}$ have a significance other than hydrogen, they are preferably in the positions meta or para to the ethylene radical. Preferably $R_9$ and $R_{10}$ signify hydrogen.

If the alkylene bridge in the significance of $R_{11}$ contains 3 or 4 carbon atoms, it is preferably branched.

The above optical brighteners are known or may be produced by known methods analogously to known brighteners. Anionic optical brighteners of the diaminostilbene and bisstilbyl series are described e.g. in U.S. Pat. No. 4,888,128, anionic optical brighteners of the 1,3-diphenylpyrazoline series are described e.g. in Rev. Prog. Coloration, Vol 17, 1987, pages 46-47. Optical brighteners of the bistriazinylaminostilbene disulphonic acid series, in particular of formula (V), are described e.g. in WO 96/00221 A1, in GB-A 1239276, 1313469 and 1471193 and in Japanese Kokais JA 62-106965 A2 and JA 63-282382 A2. Among the above optical brighteners are preferred those of formula (V), e.g. with 2 to 10 sulpho groups, in particular those containing 2 to 8, preferably 4 to 6, $-SO_3M$ groups, e.g. those described in WO 96/00221 A1.

M is preferably an alkali metal cation or hydrogen, in particular lithium, sodium and/or potassium or any combination.

The optical brighteners (B) may be employed in any form as commercially available, e.g. as powders or granules, which may be dissolved in water before combination with ($P_A$) or, with particular advantage, they may be employed in the form of an aqueous solution directly from production.

According to a particular feature of the invention (B) is combined with ($P_A$) prior to completion of the polymerisation and/or crosslinking reaction.

The produced polymer ($P_A$), if desired in admixture with another cationic polymer, especially with a cationic starch, e.g. in the weight ratio of the latter to ($P_A$) of up to 20%, expediently in the form of an aqueous solution, may be combined with a solution of (B). Preferably however ($P_A$) is not combined with other cationic polymers. According to one feature of this process, the aqueous solution of (B) is added to the aqueous solution of ($P_A$), preferably stepwise and with heating, e.g. at temperatures in the range of 40° C. to the boil, preferably 40 to 90° C. According to a preferred feature of this process variant, the solution of (B) is added before polymerisation and/or crosslinking of ($P_A$) has completed. For the production of a composition from ($P_{A2}$) or ($P_{A3}$) it is preferred to add at least a part of the optical brightener (B) before the crosslinking reaction has completed and to add the remaining portion of the solution of (B) during the crosslinking reaction, so that there is obtained an aqueous composition in which the optical brightener anions are the counter-ions to a part of the cations of ($P_{A2}$) or ($P_{A3}$) and (B) is also entrained by (or entangled with) ($P_{A2}$) or ($P_{A3}$) Similarly, for a derivative of ($P_{A1}$) it is of advantage to add the solution of (B) during crosslinking—e.g. when starting from a secondary amine and, if crosslinking is promoted by the intermediate addition of a strong base, for instance of sodium hydroxide, the optical brightener solution may be added simultaneously with or subsequently to the addition of the base. The pH is chosen suitably in such a way that salt-formation of ($P_A$) with (B) is favoured, expediently in the weakly acidic to distinctly alkaline range, preferably at a pH in the range of 5 to 10, more preferably 5.5 to 9. The ratio of (B) to ($P_A$) or to its precursor is chosen in such a way that the obtained product ($P_{AB}$) is of cationic character, which means that the number of cations, in particular of quaternary cations, in ($P_A$) or respectively in ($P_{AB}$) is larger than the number of anions introduced with (B). The ratio of total anionic groups introduced with (B) to the total quaternary ammonium groups in ($P_A$) or respectively ($P_{AB}$) is e.g. in the range of 2/100 to 60/100. The weight ratio of (B) to ($P_A$) is chosen accordingly in a suitable way, e.g. in the range of 1/100 to 40/100; the weight ratio of (B) to a suitable precursor of ($P_A$) is chosen accordingly. The catonicity of ($P_{AB}$), i.e. the amount of quaternary ammonium groups not engaged with (B), expressed in milliequivalents per gram of ($P_{AB}$), is inferior, preferably by at least 0.1 meq/g, to the one of ($P_A$) and is e.g. in the range of 0.1 to 1.2 meq/g, preferably 0.2 to 1 meq/g, more preferably 0.45 to 0 85 meq/g, at pH 7. The catonicity may be assessed e.g. by means of a "Charge Analyser" fitted with a photoelectric cell, by titration of a 0.1 weight-% ($P_{AB}$)-solution with a polyvinyl potassium sulphate solution (e.g. 0.00052N), using Toluidine Blue as an indicator (from blue=cationic to pink=anionic), at pH 4, 7 and 9 (adjusted by means of hydrochloric acid or potassium hydroxide solution).

The rate of addition and the concentration of the components is expediently chosen in such a way that a distinct increase of the viscosity of the obtained solution takes place and the solution of combined product ($P_{AB}$) is still easily stirrable, e.g. of a viscosity below 5000 cP, preferably in the range of 200 to 4000 cP. A suitable concentration for the solution of (B) is in the range of 5 to 70, preferably 10 to 50% by weight. A suitable concentration for the solution of ($P_A$) is in the range of 10 to 80, preferably 20 to 70% by weight. A suitable concentration for the produced solution of ($P_{AB}$) is in the range of 10 to 90, preferably 20 to 80% by weight. A particularly preferred viscosity for these concentrations is in the range of 500 to 2000 cP. The obtained aqueous composition of ($P_{AB}$) is an aqueous solution, i.e. a true or at least colloidal solution. It may be used directly as produced, or—if desired—it may be modified in salt content and/or concentration e.g. by membrane filtration, and/or it may be combined with any further desired components, e.g. with an additive that stops the growth of disturbing microorganisms or with a biocide e.g. in a concentration of 0.001 to 0.1% by weight referred to the liquid composition. The pH of the solution of the combined product ($P_{AB}$), for application to (M) is preferably in the range of 5 to 9, more preferably in the range of 6 to 8. The so produced compositions combine the properties of component (B) as an optical brightener and of component ($P_A$) as an internal or external functional additive in papermaking, for instance as a flocculant, drainage assistant, retention adjuvant or fixative.

The white pigments (W') which are the products of the application of ($P_A$) to (M), have a distinct cationic character and combine the physical properties of (M) with the chemical properties of the cationic modification by ($P_A$); i.e. they may be used analogously to (M) as pigments or fillers in various stages of paper production, and they are optically brightenable with any anionic optical brighteners, in particular with (B), to a high degree, they favour drainage, retention and fixation, and the compacted forms are readily dispersible in water to give a regular suspension that may be used for producing white-pigment-containing coating masses, size liquors or paper pulp suspensions. The white pigments (W) are also readily compatible with other cationic products that might be used in paper production, such as drainage aids, retention assistants and fixatives, e.g. with cationic starches. The white pigments (W) not only are optically brightenable, but if they are white pigments (W") that contain (B) in the form of ($P_{AB}$), they are of surprisingly high whiteness and furthermore may, if desired, be further optically brightened with further anionic optical brighteners to "super white" pigments (W''').

The white pigments (W) of the invention, especially (W"), are of high whiteness and may be employed as white fillers or pigments in any field of technique where inorganic white pigments are employed, e.g. in paints, varnishes, cosmetics, construction materials and plastics, but most preferably in papermaking.

The white pigments (W) of the invention, expediently in the form of aqueous composition as produced by the method described above, serve as fillers or pigments and may simultaneously—due to their cationicity—also contribute to the drainage, retention or fixation in the production of paper, and also to a reduction of the amount of backwater components, e.g. turbidity, in backwaters (white waters) from paper production.

The invention thus provides also a method for producing paper, in particular a paper web or sheet, from aqueous stock, wherein (W) is employed as a white pigment or filler.

As "paper" there is intended herein also paper board and cast paper shapes. As an aqueous stock there is intended any stock, in particular cellulosic stock, as employed for papermaking and wherein the pulp suspension may derive from any origin as conventionally employed for papermaking, e.g. virgin fibre (chemical or mechanical pulp), machine broke (in particular coated broke) and reclaimed paper (especially deinked and optionally bleached reclaimed paper). The aqueous paper pulp or stock may also contain further additions as may be desired for a certain quality, such as sizing agents, fillers, flocculating agents, drainage and/or retention assistants, which may be added before or after the addition of (W) or also simultaneously, as suitable for the particular concerned method. The stock concentration may vary in any conventional range as suitable for the employed pulp, machine, process and desired paper quality, e.g. in the range of 0.4 to 10%, preferably 0.8 to 6%, by weight of dry pulp. According to a particular feature of the invention there is employed a pulp from coated broke and/or bleached, deinked reclaimed paper optionally blended with other pulp.

a mixture of 90.4 parts of 32% sodium hydroxide, 301.8 parts of a 18.4% aqueous solution of the sodium salt of the optical brightener of formula

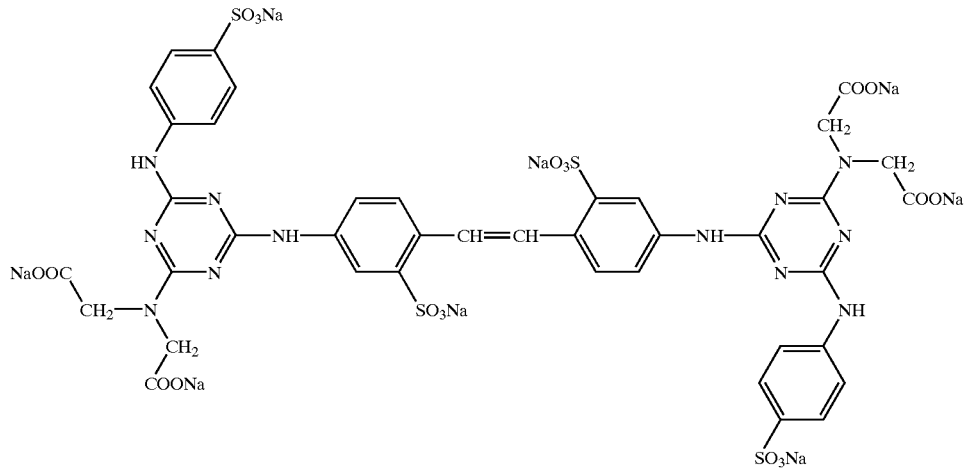

The concentration and other application conditions may vary broadly depending on the particular application (as filler or pigment, in the paper mass or in a coating paste). The pH may be in the weakly basic to distinctly acidic range, preferably in the range of pH 4 to pH 8, more preferably pH 5 to pH 7. The concentration may be chosen depending also on the presence of (B). The paper may be produced using any conventional paper making machines and in a manner conventional per se. The resulting backwater is of reduced contaminants content, in particular of reduced turbidity, and consequently the respective BOD and/or COD values are also reduced. By the use of (W) there may also be achieved an improvement of the efficiency of other cationic wet-end additives such as flocculants, retention assistants or drainage assistants, and there may be obtained paper of optimum quality while the occurrence of paper breakages due to disturbing anionic contaminants is correspondingly reduced, while the efficiency of the optical brightener (B) is optimal and there may be obtained paper of very regular whiteness in high yield. The so produced paper may in particular be employed as a substrate for ink-jet-printing.

In the following Examples parts and percentages are by weight, if not otherwise indicated; parts by weight relate to parts by volume as grams to milliliters; the temperatures are indicated in degrees Celsius; in Application Examples C and D ° SR signifies degrees Schopper-Riegler and the percentages relate to the weight of the starting aqueous pulp suspension.

Synthesis of $(P_A)$ and $(P_{AB})$

EXAMPLE 1

70.2 parts of sorbitol are mixed with 35.5 parts of glycerol and heated to 90° C. to form a solution. 0.5 part of boron trifluoride acetic acid complex is added and the mixture is stirred to disperse the catalyst through the reaction mixture. 212.7 parts of epichlorohydrin are added dropwise at 80° C. with cooling. The reaction mixture is then cooled to 50° C. and vacuum is applied. 86.6 parts of an aqueous 60% dimethylamine solution are added and the reaction mixture is allowed to heat slowly to 90° C. maintaining the vacuum. After one hour the reaction mixture is cooled to 60° C. and 198.4 parts of demineralised water is added over 90 minutes. The reaction mixture is held at 55–60° C. and the mixture slowly thickens as it polymerises. Finally when the reaction mixture reaches the viscosity of 820 cP (Brookfield RVT, at 20° C., spindle Nr. 4, 100 rpm) the reaction is stopped by the addition of 5 parts of formic acid to give a pH of 5–6. The solids content of the product is 47.1%. The measured cationic charge is 388 meq/l (=0.824 meq/g referred to the dry substance) at pH 4, 309 meq/l (=0.657 meq/g referred to the dry substance) at pH 7 and 220 meq/l (=0.468 meq/g referred to the dry substance) at pH 9.

EXAMPLE 2

The procedure described in Example 1 is repeated, with the difference that 52.4 parts of pentaerythritol are used in place of 70.2 parts of sorbitol.

EXAMPLE 3

The procedure described in Example 1 is repeated, with the difference that 23.9 parts of ethylene glycol are employed instead of 35.5 parts of glycerol.

EXAMPLE 4

The procedure described in Example 1 is repeated, with the difference that 131 parts of 60% tetramethylethylenediamine are employed instead of 86.8 parts of 60% dimethylamine.

EXAMPLE 5

The procedure described in Example 1 is repeated, with the difference that 71 parts of glycerol are employed instead of the mixture of 70.2 parts of sorbitol and 35.5 parts of glycerol.

EXAMPLES 6 to 12

The procedure described in Example 1 is repeated, with the difference that there is employed a 20% aqueous solution of the optical brightener of formula

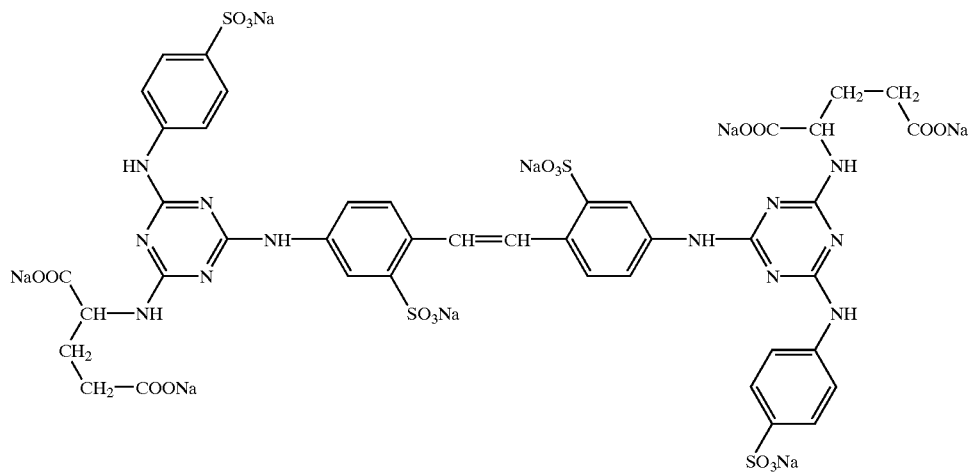
or of the optical brightener of formula
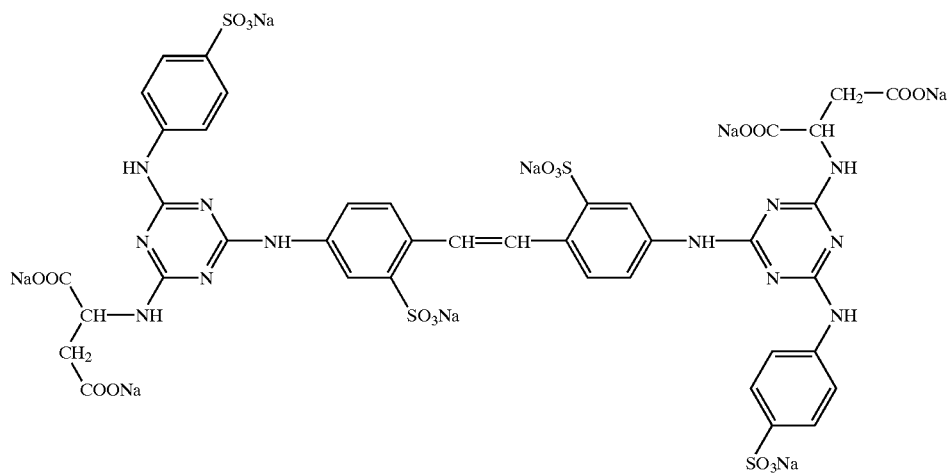
or of the optical brightener of formula
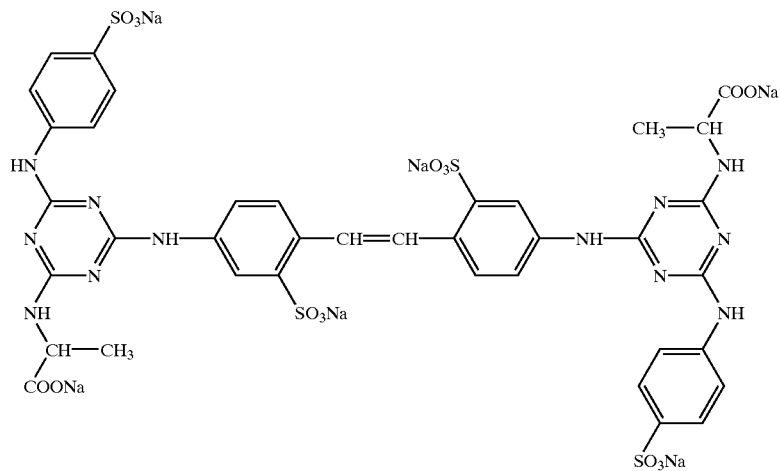

or of the optical brightener of formula
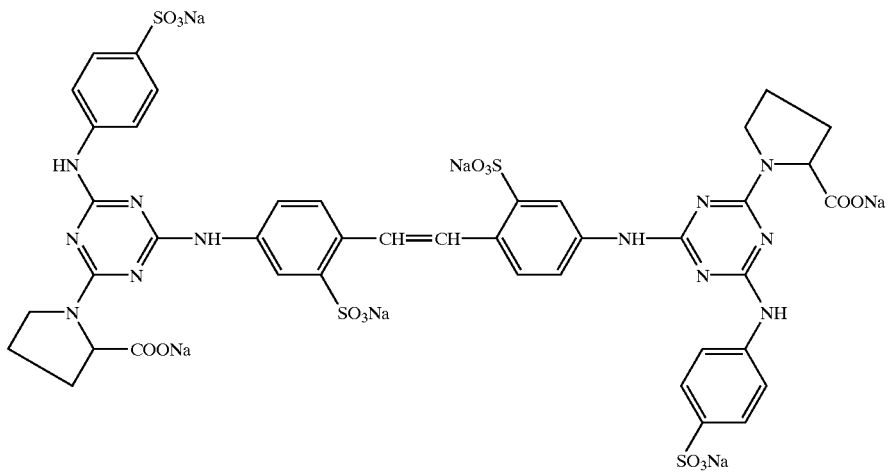
or a 23% aqueous solution of the optical brightener of formula
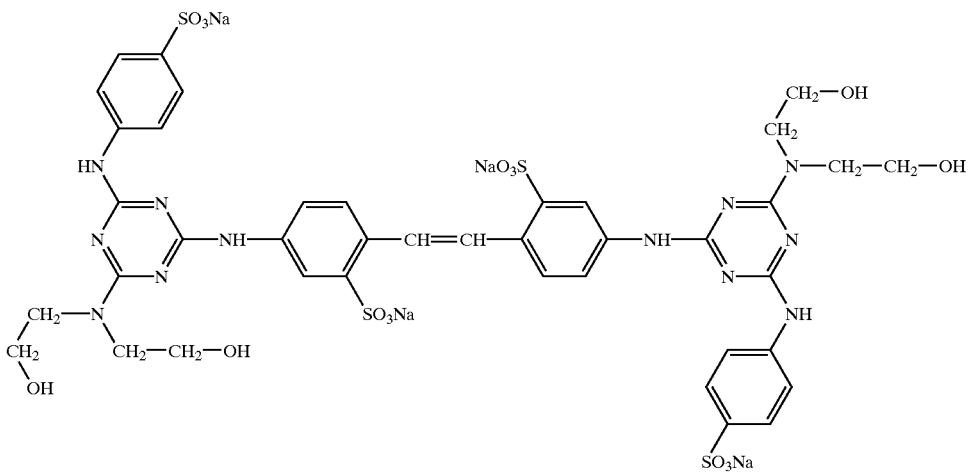
or a 12% aqueous solution of the optical brightener of formula
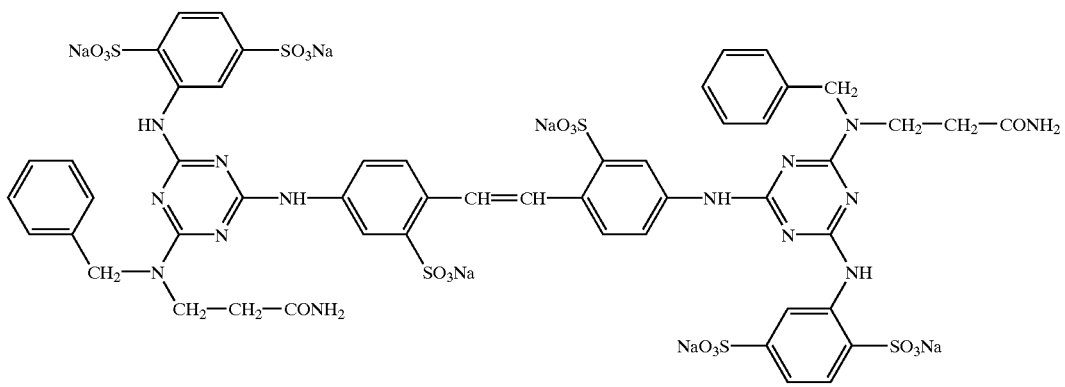

or of the optical brightener of formula

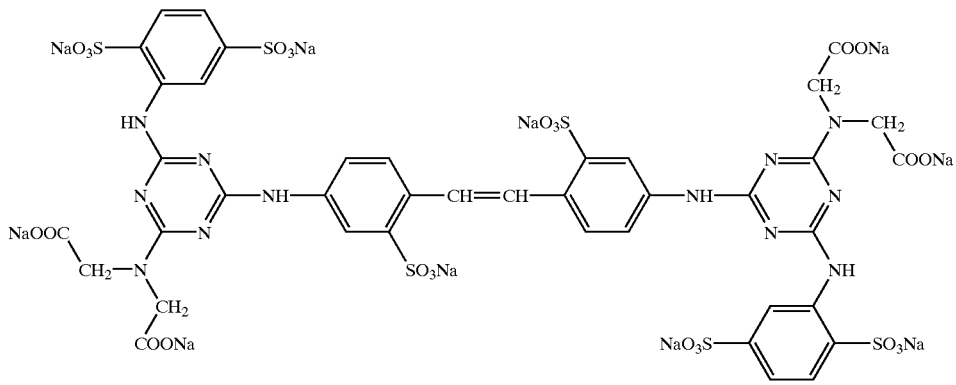

EXAMPLE 13

1.9 part of boron trifluoride acetic acid complex is added with stirring to 50 parts of polyethylene glycol 400 and the mixture is stirred and cooled to 70–75° C. Stirring is continued for further 30 minutes at 70–75° C., after which 2 parts of epichlorohydrin are added; once an exotherm is observed, further 20 parts of epichlorohydrin are added dropwise over one hour at 70–80° C. with cooling and stirring is continued at 70–80° C. for 30 minutes, after which volatile products are removed by heating to 120° C. under vacuum. The reaction mixture is cooled to 20° C. and 25.3 parts of triethylamine are added and the reaction mixture is heated slowly to 80° C. and held for 3 hours, after which any excess amine is removed under vacuum. The reaction mixture is then cooled to room temperature and 100 parts of a 19% aqueous solution of the sodium salt of the same optical brightener as in Example 11 are added.

EXAMPLE 14

The procedure described in Example 13 is repeated, with the difference that instead of polyethylene glycol 400 there is employed the equivalent amount of polyethylene glycol 600.

EXAMPLE 15

The procedure described in Example 13 is repeated, with the difference that instead of polyethylene glycol 400 there is employed the equivalent amount of polyethylene glycol 1000.

EXAMPLE 16

The procedure described in Example 13 is repeated, with the difference that instead of polyethylene glycol 400 there is employed the equivalent amount of polyethylene glycol 1500.

EXAMPLES 17 to 21

The procedures described in Examples 1, 13, 14, 15 or 16 is repeated, with the difference that no optical brightener is added.

EXAMPLE 22

109.2 parts of sorbitol are mixed with 55.2 parts of glycerol and heated to 100° C. to form a solution. One part of boron trifluoride etherate is added and the mixture is stirred and cooled to 70° C. 333 parts of epichlorohydrin are added dropwise over one hour at 70–80° C. with cooling. The reaction mixture is cooled to 20° C. and 135 parts of an aqueous 60% dimethylamine solution are added and the reaction mixture is heated slowly to 90° C. and held for one hour. The reaction mixture is than cooled to 50° C. and 150 parts of 30% sodium hydroxide and 100 parts of water are added. The mixture is held at 50–60° C. and the mixture slowly thickens as it polymerises. During this time extra water is added (275 parts) as the viscosity increases. Finally when the reaction mixture reaches the viscosity of 1000 cP the reaction is stopped by the addition of 20 parts of formic acid to give a pH of 4.

PRODUCTION EXAMPLES OF (W)

10 parts of a filler or pigment ($M_X$) are mixed in a suitable vessel with 300 parts of water and x parts of cationic product ($P_A$) or ($P_{AB}$) in the form of aqueous concentrate produced in the above Examples are added thereto with the aid of further 80 parts of water and the mixture is stirred during 5 minutes at 400 rpm and then suction-filtered through a glass fibre paper filter. The moist filter pad is transferred to a drying oven and dried at 30° C. The dried product is then ground to a fine powder of average particle size of 1 μm with >80%<2 μm and <2%>10 μm.

x=0.1, 0.2, 0.3, 0.4, 0.5, 0.6, 0.7 and 0.8.

If desired, before filtering, the product may be treated with an optical brightener.

The dried powder may directly be employed. For measuring the whiteness it may shaped into tablets by means of a tablet press. The tablet may be used for measuring the whiteness, e.g. by means of a spectrophotometer (Minolta CM-3700d).

The following catonically modified pigments ($W_X$) are produced with the following fillers or pigments ($M_X$):

for ($W_{X1}$)

($M_{X1}$) Fine, white, high purity calcium carbonate with a density by ISO 787/10 of 2.7, commercially available under the trade name HYDROCARB OG of Plüss-Stauffer AG, Oftringen, Switzerland.

for ($W_{X2}$)

($M_{X2}$) Very fine, white, natural microcrystalline calcium carbonate (calcite) slurry with a density of 1.89, commercially available under the trade name HYDROCARB 90M slurry from Omya UK or resp. Croxton and Garry Limited.

for ($W_{X3}$)

($M_{X3}$) calcium carbonate commercially available under the trade name SNOWCAL 60 from Omya UK or resp. Croxton and Garry Limited.

for ($W_{X4}$)

($M_{X4}$) Precipitated calcium carbonate commercially available under the trade name HAKUENKA TDD from Omya UK.

for ($W_{X5}$)

($M_{X5}$) Fine, white, highly refined clay commercially available under the trade name SUPREME from EEC International Ltd.

for ($W_{X6}$)

($M_{X6}$) Fine, white, highly refined clay commercially available under the trade name SPESWHITE from EEC International Ltd.

for ($W_{X7}$)

($M_{X7}$) Fine, white, high purity coating clay commercially available under the trade name SPS from EEC International Ltd.

for ($W_{X8}$)

($M_{X8}$) China Clay grade B from EEC International Ltd.

Production of Paper

Application Example A

A coating composition is prepared containing 3000 parts of the cationically modified chalk ($W_{X1}$) treated with the product of Example 1, 18 parts cationic dispersing agent, and 600 parts latex (a copolymer of n-butyl acrylate and styrene latex of pH 7.5–8.5, commercially available under the trade name ACRONAL S320D). The solids content is adjusted to 55% by the addition of water. The so prepared coating composition is then applied to a commercial 75 g/m² neutral-sized (with conventional alkyl ketene dimer), bleached paper base sheet, using an automatic wire-wound bar applicator with a standard speed setting and a standard load on the bar. The coated paper is dried for 5 minutes at 70° C. in a hot air flow. The dried paper is allowed to condition, then measured for CIE whiteness on a calibrated Datacolor ELREPHO 2000 spectrophotometer. The measured values show a surprisingly high whiteness degree and yield.

Application Example B 200 g of a pulp suspension (2.5% aqueous suspension of a 50% mixture of bleached soft wood and hard wood pulps beaten to a freeness of about 20° SR) is measured into a beaker and stirred, then 40% filler suspension [80 g of 100 g/liter ($W_{X3}$) in water] is added. After the addition the mixture is stirred for a further 0.5 minutes and then 1.7% (3.4 g) of neutral size is added (typically a dispersion of 2.5 g of Aquapel 360X in water—Aquapel 360X is an alkylketene dimer size suspension from Hercules Ltd.). After the addition of the size a retention aid may be added—typically Cartaretin PC. The mixture is then diluted to one liter and the paper sheet is formed on a laboratory sheet former (basically this is a cylinder with a wire gauze at the bottom—the cylinder is partly filled with water, the pulp suspension is added, air is then blown through to ensure the pulp is well dispersed, a vacuum is then applied and the pulp slurry is pulled through the wire to leave a paper sheet, this sheet is removed from the wire and pressed and dried). The sheet is left in a humidity cabinet to achieve equilibrium and then the whiteness is measured using a Datacolor ELREPHO 2000 spectrophotometer. The measured values show a surprisingly high whiteness degree and yield.

Application Example C 200 g of a pulp suspension (2.5% aqueous suspension of a 50% mixture of bleached soft wood and hard wood pulps beaten to a freeness of about 20° SR) is measured into a beaker and stirred and 20% filler suspension [40 g of 100 g/liter of a suspension of ($M_{X8}$) treated with the product of Example 1, in water] is added. After the addition the mixture is stirred for a further 5 minutes and then 2% of rosin size solution is added (typically—'T size 22/30' from Hercules), the mixture is stirred for a further 2 minutes and then 3 ml of alum solution (50 g alum in 1 liter water) are added and the mixture is stirred for a further 2 minutes. The mixture is then diluted to one liter and the paper sheet is formed on a laboratory sheet former. The sheet is left in a humidity cabinet to achieve equilibrium and then the whiteness is measured using a Datacolor ELREPHO 2000 Spectrophotometer. The measured values show a surprisingly high whiteness degree and yield.

Analogously as the product of Example 1, the products of each of Examples 2 to 16 are employed in the above Application Examples A, B and C.

Application Example D

Application Example A is repeated, with the difference that instead of ($W_{X1}$) treated with the product of Example 1 there is employed the same amount of ($W_{X1}$) treated with the product of Example 17 and p g/l of the optical brightener employed in Example 1 are added, p being 1, 2, 3, 4, 5, 6, 7 and 8.

Application Example E

Application Example B is repeated, with the difference that instead of ($W_{X3}$) treated with the product of Example 1 there is employed the same amount of of ($W_{X3}$) treated with the product of Example 17 and p g/l of the optical brightener employed in Example 1 are added, p being 1, 2, 3, 4, 5, 6, 7 and 8.

Application Example F

Application Example C is repeated, with the difference that instead of ($W_{X8}$) treated with the product of Example 1 there is employed the same amount of ($W_{X8}$) treated with the product of Example 17 and p g/l of the optical brightener employed in Example 1 are added, p being 1, 2, 3, 4, 5, 6, 7 and 8.

Analogously as the product of Example 17, the products of each of Examples 18 to 22 are employed in the above Application Examples D, E and F.

What is claimed is:

1. A cationically modified white pigment (W) in particulate form, consisting essentially of:

a particulate inorganic white pigment (M) of a particle size in the range of 0,1 to 40 μm;

an applied water soluble, cationic, crosslinked polymer ($P_A$) containing quaternary ammonium groups in salt form, where ($P_A$) is a polymer obtained by crosslinking with an at least bifunctional secondary or tertiary amine the chloroterminated reaction product of an oligofunctional aliphatic alcohol with epichlorohydrin and optionally further reacting any non reacted chlorine with a tertiary amine under conditions leading to at least partial crosslinking, in combination with an anionic optical brightener (B) and where the molar ratio of (B) to ($P_A$) is such that the number of cationic charges of the total polymer ($P_A$) is higher than the number of anionic charges of the total anionic optical brightener (B).

2. Cationically modified white pigment (W) according to claim 1, wherein (B) and ($P_A$) are employed in the form of a combination thereof, which either is a mixture of (B) in free acid or alkali metal salt form and ($P_A$) in which the counter-ions to the cationic quaternary ammonium groups are anions of mineral acids, anions of low molecular carboxylic acids or anions deriving from a quaternizing agent, in which mixture the number of cationic charges of the polymer ($P_A$) is higher than the number of anionic charges of the anionic optical brightener (B), or is a polycationic polymer ($P_{AB}$) which is a partial (B)-salt of ($P_A$), wherein a part of the counter-ions to the quaternary cationic groups of ($P_A$) are anionic groups of anionic optical brightener (B).

3. Cationically modified white pigment (W) according to claim 2, wherein ($P_{AB}$) is a cationic polymer obtained by carrying out the crosslinking for the production of ($P_A$) in the presence of (B).

4. Cationically modified white pigment (W) according to claim 1, in dry, pourable, particulate, optionally agglomerated, form, or in the form of an aqueous suspension.

5. Process for the production of a white pigment (W) according to claim 1 wherein (M) is admixed with an aqueous solution of ($P_A$) in combination with (B), substantially in the absence of other functional papermaking additives and paper fibres.

6. A method for the production of: a white mineral pigment or filler containing substrate or paper comprising the steps of:

providing a substrate;

providing a white mineral pigment or filler (W) as defined in claim 1; and adding white pigment or filler (W) to said substrate.

7. Process for the production of paper containing a white, inorganic filler or pigment, wherein an optically brightened white pigment (W) according to claim 1 is employed as a white filler or pigment.

8. Aqueous composition containing (W) as defined in claim 1.

9. Aqueous composition according to claim 8, which is a paper coating paste.

10. A process for the production of coated paper, wherein an aqueous paper coating composition according to claim 9 is applied to a paper sheet and dried.

11. Process according to claim 7, wherein (W) is used together with a cationic starch (C).

12. A (W)-containing substrate, produced according to claim 7.

13. A white mineral pigment or filler containing substrate comprising cationically modified white pigment (W) as defined in claim 1.

14. Paper comprising cationically modified white pigment (W) as defined in claim 1.

15. Cationically modified white pigment (W) according to claim 1, wherein the oligofunctional aliphatic alcohol is selected from hydroxy compounds of the following formula

in which X signifies the x1-valent radical of a $C_{3-6}$-alkane or of a corresponding cyclic ether and x1 signifies a number from 3 to the number of carbon atoms in X, or a mixture of oligohydroxyalkanes of formula (Ia), or a mixture of one or more oligohydroxyalkanes of formula (Ia) with a $C_{2-3}$-alkanediol.

16. A cationically modified white pigment ($W_2'$) in particulate form, consisting essentially of:

a particulate inorganic white pigment (M) of a particle size in the range of 0,1 to 40 µm;

an applied water soluble, cationic, crosslinked polymer ($P_{A2}'$) containing quaternary ammonium groups in salt form, obtainable by reaction of a chloroterminated addition product of epichlorohydrin with an oligofunctional aliphatic alcohol selected from hydroxy compounds of the following formula

in which X signifies the x1-valent radical of a $C_{3-6}$-alkane or of a corresponding cyclic ether and x1 signifies a number from 3 to the number of carbon atoms in X, or a mixture of oligohydroxyalkanes of formula (Ia), or a mixture of one or more oligohydroxyalkanes of formula (Ia) with a $C_{2-3}$-alkanediol;

with an at least bifunctional secondary or tertiary amine, under conditions leading to at least partial crosslinking, and optionally further reacting any non reacted chlorine with a tertiary amine.

17. The cationically modified white pigment ($W_2'$) according to claim 16, in dry, pourable, particulate, optionally agglomerated, form, or in the form of an aqueous suspension.

18. Process for the production of a white pigment ($W_2'$) according to claim 16, wherein (M) is admixed with an aqueous solution of ($P_{A2}'$), substantially in the absence of other functional papermaking additives and paper fibres.

19. A method for the production of a white mineral pigment or filler containing substrate comprising the steps of providing a substrate providing a white mineral pigment or filler ($W_2'$) as defined in claim 16 applying ($W_2'$) to the substrate.

20. Process for the production of paper containing a white, inorganic filler or pigment, wherein a white pigment ($W_2'$) according to claim 19 is employed as a white filler or pigment.

21. Aqueous composition containing ($W_2'$) as defined in claim 16.

22. Aqueous composition according to claim 21, which is a paper coating paste.

23. A process for the production of coated paper, wherein an aqueous paper coating composition according to claim 22 is applied to a paper sheet and dried.

24. Process according to claim 20, wherein ($W_2'$) is used together with a cationic starch (C).

25. A ($W_2'$)-containing substrate, produced according to claim 20.

* * * * *